(12) United States Patent
Valenti, Jr. et al.

(10) Patent No.: US 7,923,089 B1
(45) Date of Patent: Apr. 12, 2011

(54) INTEGRATED SHIPPING LABEL AND PACKING LIST FORM

(75) Inventors: F. Paul Valenti, Jr., Barrington, IL (US);
Carl Opel, Carol Stream, IL (US);
Daniel Hedger, Grayslake, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 23 days.

(21) Appl. No.: 12/346,168

(22) Filed: Dec. 30, 2008

(51) Int. Cl.
*B32B 9/00* (2006.01)
*B65D 65/28* (2006.01)
*B42D 15/00* (2006.01)

(52) U.S. Cl. ............... 428/40.1; 428/41.8; 428/42.3; 428/43; 283/72; 283/81; 283/100; 283/101

(58) Field of Classification Search ............ 428/40.1, 428/42.1–43; 283/72, 81, 98, 100, 101, 103, 283/106
See application file for complete search history.

(56) References Cited

U.S. PATENT DOCUMENTS

| | | | | |
|---|---|---|---|---|
| 4,614,361 A * | 9/1986 | Foster | ............. | 462/18 |
| 4,708,368 A * | 11/1987 | Instance | ............. | 283/81 |
| 4,983,438 A * | 1/1991 | Jameson | ............. | 428/42.3 |
| 5,071,167 A * | 12/1991 | O'Brien | ............. | 283/79 |
| 5,509,694 A * | 4/1996 | Laurash et al. | ............. | 283/81 |
| 5,800,893 A * | 9/1998 | Harden | ............. | 428/40.1 |
| 5,824,380 A * | 10/1998 | Hagen | ............. | 428/41.9 |
| 6,644,538 B1 * | 11/2003 | Schnitzer | ............. | 229/74 |
| 6,676,794 B1 * | 1/2004 | Petkovsek | ............. | 156/247 |
| 7,473,452 B2 * | 1/2009 | McKillip | ............. | 428/40.1 |
| 7,475,912 B1 * | 1/2009 | Reffett | ............. | 283/81 |

* cited by examiner

*Primary Examiner* — Patricia L Nordmeyer
(74) *Attorney, Agent, or Firm* — Ice Miller LLP

(57) ABSTRACT

An improved integrated shipping label and packing list form. In at least one embodiment of the present disclosure, such a form comprises a first sheet material, a second sheet material, and a third sheet material. The sheet materials are joined together with the first sheet material between the other two sheet materials. Lines of weakness defining at least one shipping label and packing list label are cut into the joined together sheet materials.

7 Claims, 10 Drawing Sheets

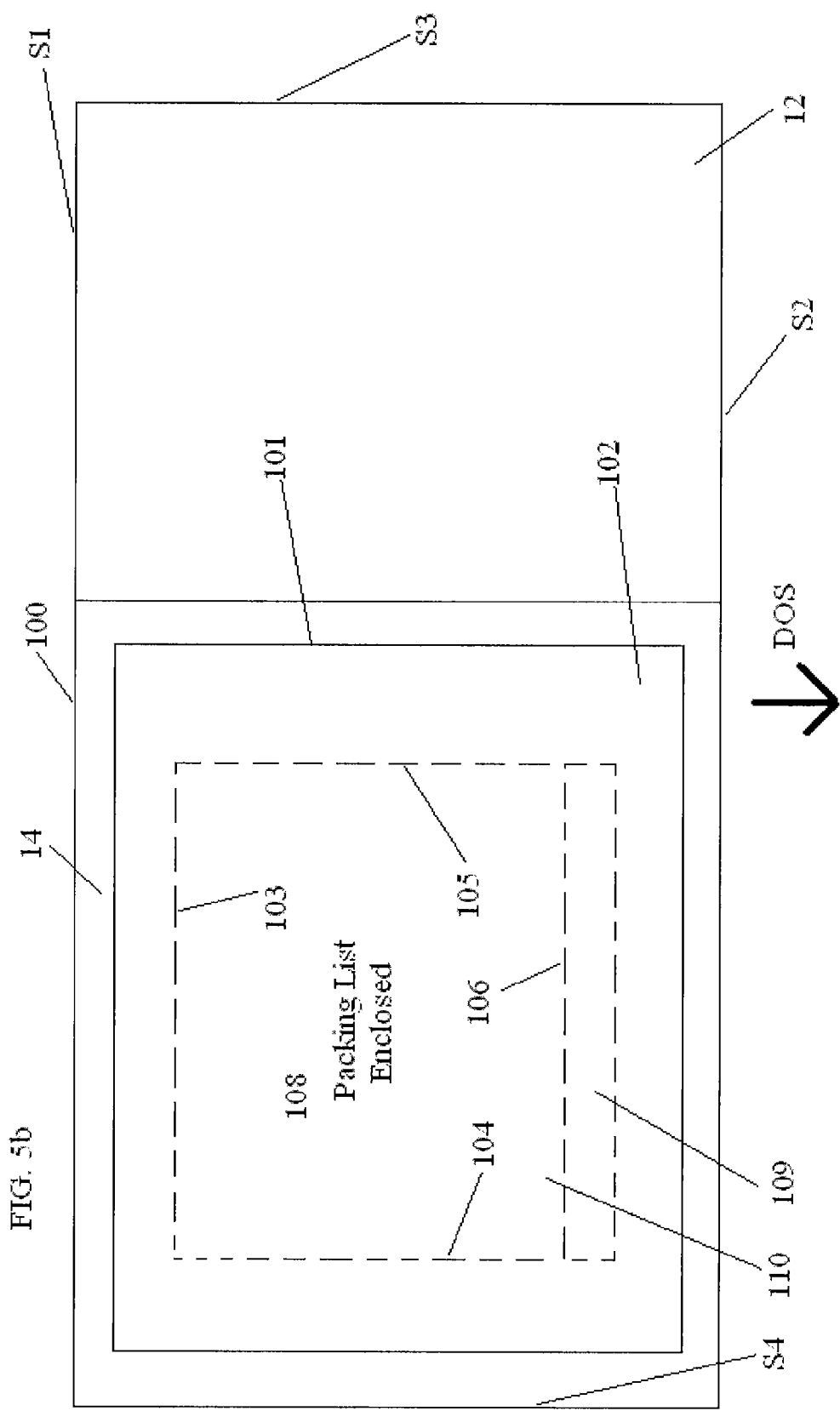

INTEGRATED SHIPPING LABEL AND PACKING LIST FORM

BACKGROUND

In many cases, in order to ship a product that is a single carton shipment, a shipper must print and apply a shipping label to the carton and also must include a packing list with that carton. It is advantageous to print the packing list and address label at the same time and on the same sheet so that the packing list and address label are readily available at the same time, and so that the packing list and address label are not separated prior to use. Frequently, the address label is applied to the outside of the package, and the packing list is placed inside the package. Integrated label sheet and packing list forms that can printed on one side by a standard single sided sheetfed desktop printer are available on the market. After printing the address label and packing list information on the sheet, these forms allow removal of the address label from the face of the sheet. After peeling the address label from the face of the packing list form, the packing list form is placed inside of the carton and the carton is sealed. However, a problem arises in that many products are manufactured and sealed into shipping cartons before it is known where they will be shipped. For example, they may be shipped in bulk to distribution centers, and then later picked and shipped in their original cartons to fulfill individual orders. For these shipments, it is inefficient to open the carton, place the packing list inside, and then reseal the carton. An integrated shipping label and packing list according to the prior art is not useful for such applications.

For the foregoing reasons, it is desired to provide an improved integrated shipping label and packing list form.

SUMMARY

The present disclosure includes disclosure of methods for manufacturing an integrated shipping label and packing list form. In at least one embodiment, such a method comprises the steps of providing a paper material, the paper material having opposing first and second sides and a first width; providing a first liner material, the first liner material comprising a silicone-coated side; providing a second liner material, the second liner material comprising a silicone-coated side; laminating the silicone-coated side of the first liner material to the second side of the paper material such that the first liner material covers less than the width of the second side of the paper material; laminating the silicone-coated side of the second liner material to the first side of the paper material such that the second liner material covers less than the width of the first side of the paper material; cutting a first packing list label boundary in the first side of the paper material, the first packing list label boundary penetrating at least part of the way through the paper material but not through the first liner material; cutting a second packing list label boundary in the first liner material, the second packing list label boundary being inboard of the first packing list label boundary, the second packing list label boundary penetrating at least part of the way through the first liner material but not through the paper material; and cutting a first shipping label boundary in the second side of the paper material, the first shipping label boundary penetrating at least part of the way through the paper material but not through the second liner material. In at least one aspect of a method according to the present disclosure, such a method comprises the step of cutting at least one line of weakness in the adhered paper material and first liner material, the at least one line of weakness being inboard of the second packing list label boundary and defining a removeable sheet, wherein at least part of the at least one line of weakness penetrates through the adhered paper material and first liner material. In at least one aspect of a method according to the present disclosure, such a method comprises the step of cutting laminated paper material and the first and second liner materials to form discrete forms, wherein each the form comprises at least one first packing list label boundary, at least one second packing list label boundary, and at least one first shipping label boundary. In at least one aspect of a method according to the present disclosure, such a method comprises step of fanfolding the laminated paper material and the first and second liner materials to form a plurality of discrete forms joined together at a plurality of fanfolds, wherein each the form comprises at least one first packing list label boundary, at least one second packing list label boundary, and at least one first shipping label boundary. In at least one aspect of a method according to the present disclosure, such a method comprises the step of applying adhesive to the silicone-coated side of the first liner material before the step of laminating the silicone-coated side of the first liner material to the second side of the paper material. In at least one aspect of a method according to the present disclosure, such a method comprises the step of applying adhesive to the silicone-coated side of the second liner material before the step of laminating the silicone-coated side of the second liner material to the first side of the paper material. In at least one aspect of a method according to the present disclosure, such a method comprises the step of printing indicia on at least one of the first side of the first sheet material, the second side of the first sheet material, the second side of the second sheet material, and the second side of the third sheet material. In at least one aspect of a method according to the present disclosure, such a method comprises the step of printing a first indicia on the first side of the paper material, the first indicia being printed in registration with a location of the first packing list label boundary.

The present disclosure includes disclosure of systems for producing integrated shipping label and packing list forms. In at least one embodiment, such a system comprises a first source of a first sheet material, the first sheet material comprising opposing first and second sides, the first sheet material having a first width; a second source of a second sheet material, the second sheet material comprising at least one silicone-coated side, the second sheet material having a second width, the second width being less than the first width; a third source of a third sheet material, the third sheet material comprising at least one silicone-coated side, the third sheet material having a third width, the third width being less than the first width; a first laminating station, the first laminating station being operable to adhere the silicone-coated side of the second sheet material to the second side of first sheet material; a second laminating station, the second laminating station being operable to adhere the silicone-coated side of the third sheet material to the first side of first sheet material; at least one diecutting station, the at least one diecutting station being operable to (a) cut a first packing list label boundary in the first side of the first sheet material, the first packing list label boundary penetrating at least part of the way through the first sheet material but not through the second sheet material, (b) cut a second packing list label boundary in the second sheet material, the second packing list label boundary being inboard of the first packing list label boundary, the second packing list label boundary penetrating at least part of the way through the second sheet material but not through the first sheet material, and (c) cut a first shipping label boundary in the second side of the first sheet material, the first shipping label boundary penetrating at least part of the way through the first sheet material but not through the third sheet material. In at least one aspect of a system according to the present disclosure, such a system comprises at least one printer, the least one printer being operable to print indicia on at least one of the first side of the first sheet material, the second side of the first sheet material, the second side of the second sheet material, and the second side of the third sheet material. In at least one aspect of a system according to the present disclosure, such a system comprises a first printer, the first printer being operable to print first indicia on the first side of the first sheet material in registration with a location of the first packing list label boundary. In at least one aspect of a system according to the present disclosure, such a system comprises at least one adhesive applicator operable to apply adhesive to the silicone-coated side of the second sheet material prior to such time as the silicone-coated side of the second sheet material is adhered to the second side of first sheet material. In at least one aspect of a system according to the present disclosure, such a system comprises at least one adhesive applicator operable to apply adhesive to the silicone-coated side of the third sheet material prior to such time as the silicone-coated side of the third sheet material is adhered to the first side of first sheet material.

The present disclosure includes disclosure of integrated shipping label and packing list forms. In at least one embodiment, such an integrated shipping label and packing list form comprises a first sheet material having opposing first and second sides and a first width; a second sheet material having opposing first and second sides and a second width, the second width being less than the first width, the first side of the second sheet material comprising a release coating (such as, for example, a silicone coating) on at least a portion thereof, wherein the first side of the second sheet material is adhered to the second side of the first sheet material; a third sheet material having opposing first and second sides and a third width, the third width being less than the first width, the first side of the third sheet material comprising a release coating (such as, for example, a silicone coating) on at least a portion thereof, wherein the first side of the third sheet material is adhered to the first side of the first sheet material; a first packing list label boundary defined in the first side of the first sheet material; a second packing list label boundary defined in the second side of the second sheet material, the second packing list label boundary being inboard of the first packing list label boundary; and a first shipping label boundary defined in the second side of the first sheet material. In at least one aspect of an integrated shipping label and packing list form according to the present disclosure, the sum of the second width and the third width is not greater than the first width. In at least one aspect of an integrated shipping label and packing list form according to the present disclosure, the first sheet material comprises opposing first and second edges, and wherein the second sheet material is substantially flush with the first edge. In at least one aspect of an integrated shipping label and packing list form according to the present disclosure, the third sheet material is substantially flush with the second edge.

In at least one aspect of an integrated shipping label and packing list form according to the present disclosure, such an integrated shipping label and packing list form comprises a packing list label comprising adhered-together portions of a first sheet material and a second sheet material, the packing list label being separable from the first sheet material at a first packing list label boundary and from the second sheet material at a second packing list label boundary, wherein if the packing list label is separated at the first packing list label boundary and at the second packing list label boundary the packing list label comprises an anterior surface and a posterior surface, the anterior surface comprising a portion of the first sheet material within the first packing list label boundary, the posterior surface comprising a portion of the second sheet material inboard of the second packing list label boundary and a portion of the first sheet material outside of the second packing list label boundary and within the first packing list label boundary, wherein the segment of the posterior surface outside of the second packing list label boundary and within the first packing list label boundary is at least partially covered with an adhesive.

In at least one aspect of an integrated shipping label and packing list form according to the present disclosure, such an integrated shipping label and packing list form comprises a packing list label that comprises at least one line of weakness in the adhered first sheet material and second sheet material and inboard of the second packing list label boundary, the at least one line of weakness defining a packing list sheet removeable from the packing list label at the at least one line of weakness.

In at least one aspect of an integrated shipping label and packing list form according to the present disclosure, such an integrated shipping label and packing list form comprises a shipping label, the shipping label comprising a portion of the first sheet material within the first shipping label boundary, the shipping label being separable from the first sheet material at the first shipping label boundary and removable from the third sheet material, wherein if the shipping label is separated at the first shipping label boundary and removed from the third sheet material, the shipping label comprises a front surface and an opposing rear surface, the rear surface corresponding to the first side of the first sheet material, the rear surface being at least partially covered with an adhesive.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein:

FIG. 5b shows an integrated shipping label and packing list form and a manufacturing direction of travel according to at least one embodiment of the present disclosure.

DESCRIPTION

Figure 1:
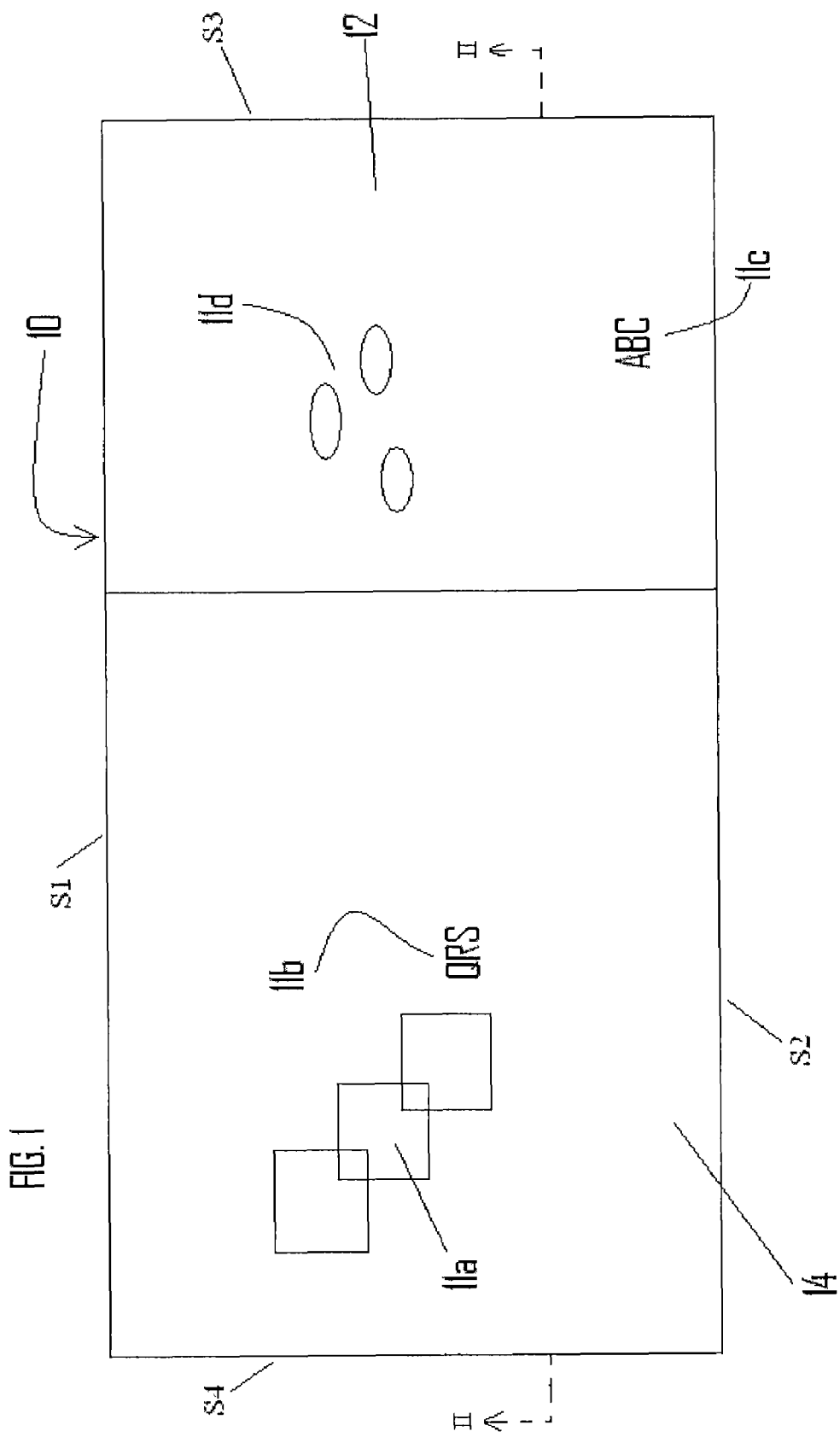
FIG. 1 shows a top view of a label sheet according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

According to at least one embodiment of the present disclosure, a label sheet generally includes at least three plies of material such as, for example, a paper material ply and two liner plies. However, it is within the scope of the present disclosure that a label sheet may include more than three plies of material, as well as different types of materials.

In at least one embodiment of a label sheet according to the present disclosure, three plies of material may be layered on top of one another in the following sequence from top to bottom: a first liner ply, a paper material ply, and then a second liner ply. The first and second liners plies may be silicone coated liners, where a side of a liner may be coated with silicone, or the like. The paper material ply may include a web of bond paper, offset paper, or similar paper. In order to adhere the liner plies to the paper material ply, adhesive may be placed between the first liner ply and the paper material ply and between the second liner ply and the paper material ply. The adhesive between the first liner ply and the paper material ply may be coextensive with the surface area of the first liner ply, but it is not required that the adhesive be coextensive with the surface area of the first liner ply. Likewise, the adhesive between the paper material ply and the second liner ply may be coextensive with the surface area of the second liner ply, but it is not required that the adhesive be coextensive with the surface area of the second liner ply.

In at least one embodiment of a label sheet according to the present disclosure, the first and second liner plies may be substantially the same size. In other embodiments, the first and second liner plies may be different sizes. The first and second liner plies may be smaller in size than the paper material ply. For instance, in at least one embodiment of the present disclosure, the first liner ply may have a width that is about forty percent of the width of the paper material ply, while the second liner ply may have a width that is about fifty-nine percent of the width of the paper material ply. Using these width requirements for liner plies and a paper material ply having standard dimensions of 8.5 inches by 11 inches, the first liner ply may be about 4.5 inches wide and the second liner ply may be about 6.375 inches wide. The liner plies may have lengths and thicknesses that are substantially the same as the paper material ply or they may have different lengths and/or thicknesses. Generally, the paper material ply and first and second liner plies may be rectangular or square-shaped. However, the paper material ply and liner plies may be other shapes. The dimensions of the paper material ply and liner plies may generally be constrained because of specified parameters for the sheet, packing list, shipping label, or other parts of the label sheet.

FIG. 1 shows a top view of label sheet 10 according to at least one embodiment of the present disclosure. Label sheet 10 of FIG. 1 comprises liner ply 12 comprising release coating 12a, adhesive layer 13, paper material ply 14, adhesive layer 15, and liner ply 16 comprising release coating 16a. Only liner ply 12 and paper material ply 14 of label sheet 10 are visible in FIG. 1.

Release coatings 12a, 16a may comprise a material such as, for example, a silicone material, that allows the removable adherence of liner plies 12, 16, respectively, to paper material ply 14. Any type of coating material (including no-silicone coatings) that permits the removable adherence of liner plies 12, 16, respectively, to paper material ply 14 may be used.

As shown in FIG. 1, label sheet 10 includes four edges comprising the boundary of the sheet 10, namely edge one S1, edge two S2, edge three S3, and edge four S4. Paper material ply 14 may comprise indicia 11a, 11b. Similarly, liner ply 12 may comprise indicia 11c, 11d. Such indicia may be information such as, for example, return and/or mailing addresses, directions on how to use label sheet 10, company information such as phone numbers and the name of the company, or the like. Such indicia may include, for example, information explaining the return or exchange policy for a package affixed with a label with the indicia. According to at least one embodiment of the present disclosure, any or all of indicia 11a, 11b, 11c, 11d may be variable, or different, between two discrete label sheets. In another embodiment of the present disclosure any or all of indicia 11a, 11b, 11c, 11d may be static, or the same, between two discrete label sheets. Where variable indicia is used, it may provide, for example, for different bar codes, different identifying numbers, different shipping addresses, or different maxicodes for different label sheets in a series of label sheets.

Figure 2:
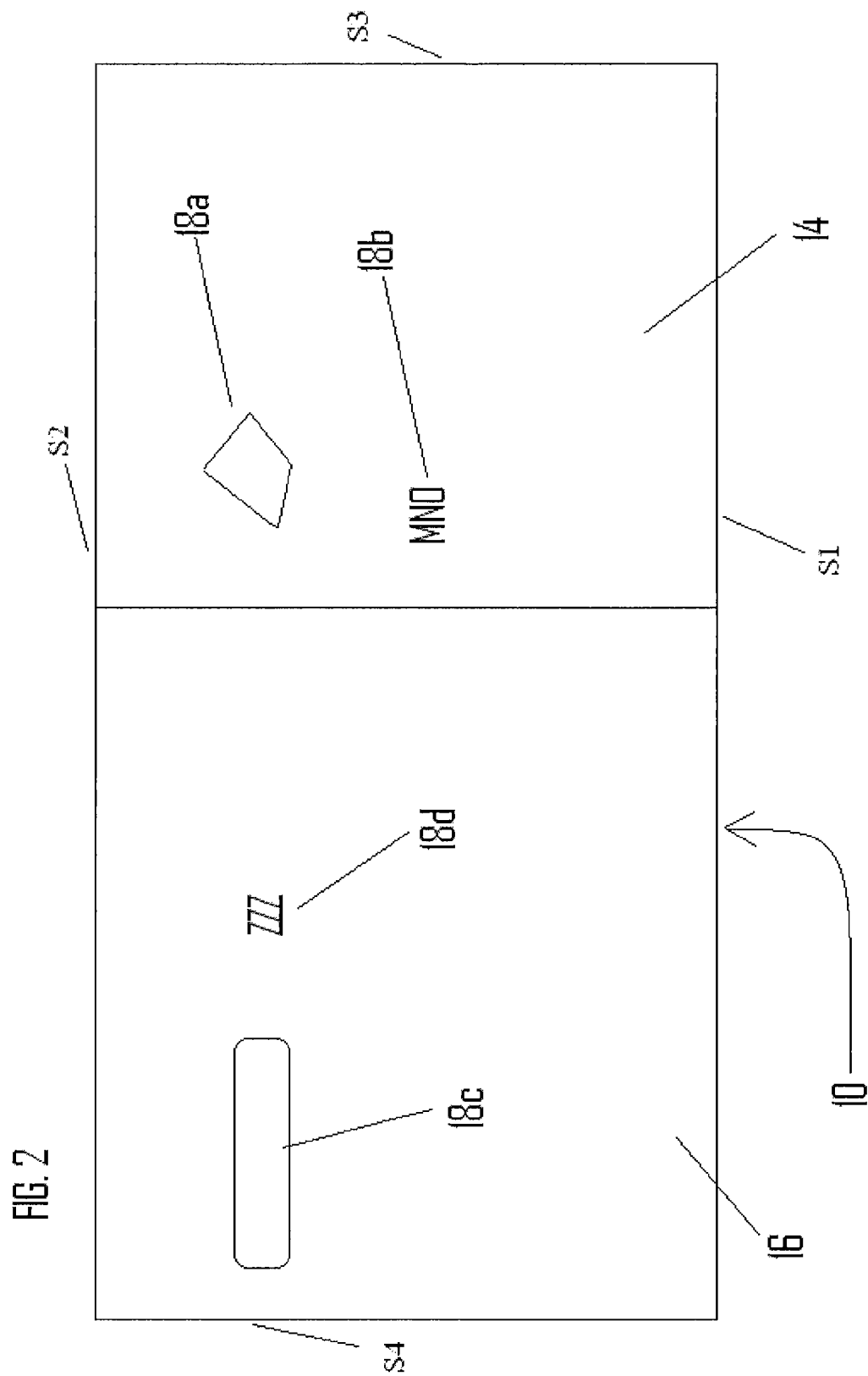
FIG. 2 shows a bottom view of the label sheet of FIG. 1 according to at least one embodiment of the present disclosure.

FIG. 2 shows a bottom view of label sheet 10 of FIG. 1. Paper material ply 14 and liner ply 16 are visible in FIG. 2. Also shown in FIG. 2 are edge one S1, edge two S2, edge three S3, and edge four S4. Paper material ply 14 comprises indicia 18a, 18b thereon. Similarly, liner ply 16 comprises indicia 18c, 18d thereon. Indicia 18a, 18b, 18c, 18d generally include printed indicia. The printed indicia may be information such as, for example, return and/or mailing addresses, a tracking number, bar codes, maxicodes, billing account information, or other relevant information. Such indicia may include information useable by a shipping company such as, for example, United Parcel Service, the U.S. Postal Service, or DHL, among others. According to embodiments of the present disclosure, such indicia may be variable or static. Where variable indicia is used, it may provide, for example, for unique bar codes, unique identifying numbers, unique shipping addresses, or unique maxicodes for each label sheet in a series of label sheets.

Figure 3A:
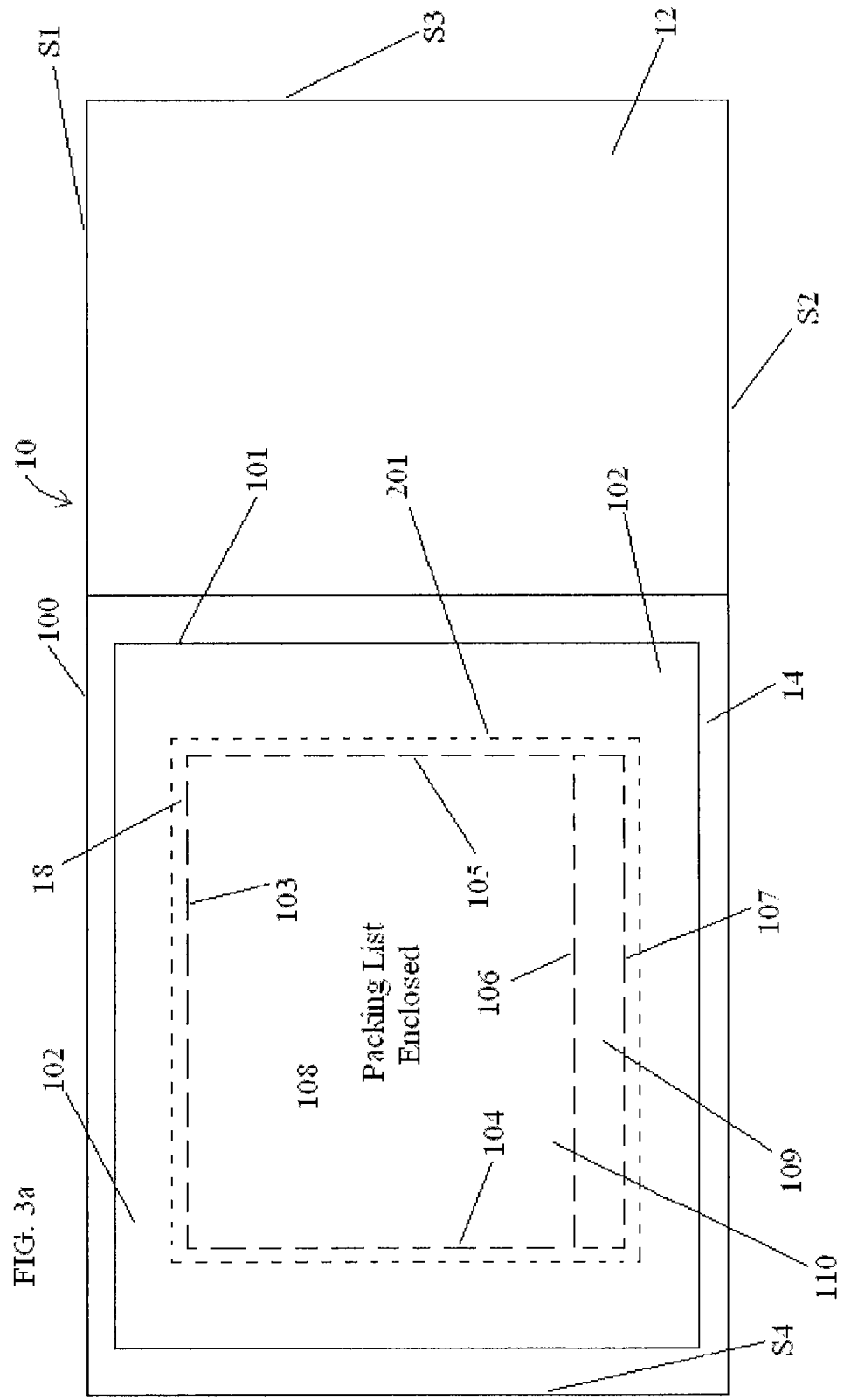
FIG. 3a shows a top view of an integrated shipping label and packing list form according to at least one embodiment of the present disclosure.

FIG. 3a shows a first side 100 of a label sheet 10 according to at least one embodiment of the present disclosure. Label sheet 10 of FIG. 3a comprises liner ply 12 comprising release coating 12a, adhesive layer 13, paper material ply 14, adhesive layer 15, and liner ply 16 comprising release coating 16a. Only liner ply 12 and paper material ply 14 are visible in FIG. 3a. Adhesive layer 13 (not visible in FIG. 3a) is between liner ply 12 and paper material ply 14. As shown in FIG. 3a, label sheet 10 includes four edges comprising the boundary of label sheet 10, namely edge one S1, edge two S2, edge three S3, and edge four S4.

As shown in FIG. 3a, label sheet 10 comprises comprising packing list label 18, packing list 108, and lines of weakness 101, 103, 104, 105, 106, 107. Line of weakness 101 defines a boundary of packing list label 18. Packing list label 18 comprises lines of weakness 103, 104, 105, 106, 107, and 201. Line of weakness 201 is not visible from first side 100 in this embodiment of the present disclosure, but is shown in phantom in FIG. 3a. Lines of weakness 103, 104, 105, 106 define the boundary of packing list 108. The area of packing list label 18 between line of weakness 101 and line of weakness 201 comprises frame section 102. Lines of weakness 104, 105, 106, 107 define the boundary of peel strip 109. Packing list 108 comprises first packing list surface 110.

Figure 3B:
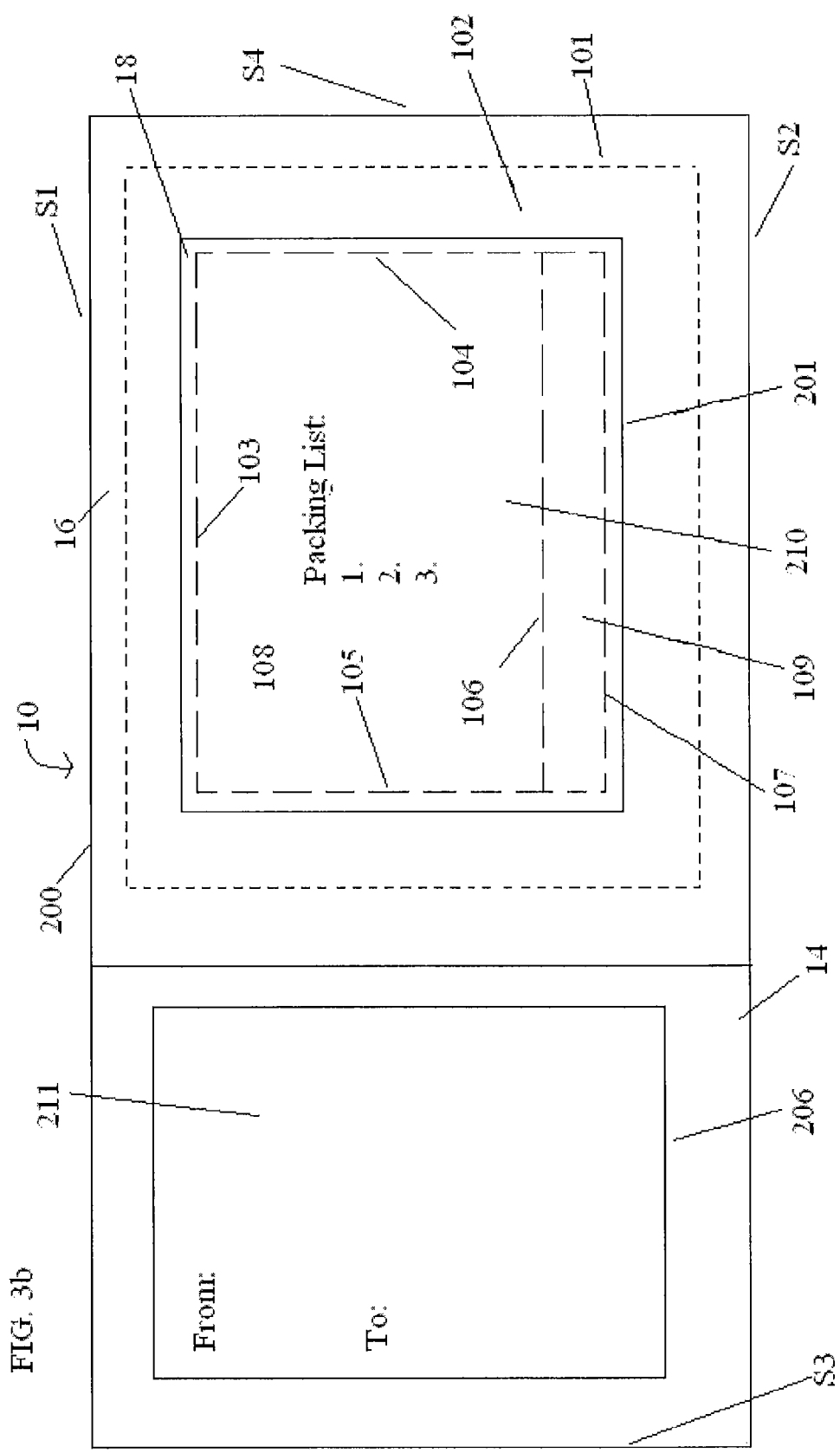
FIG. 3b shows a bottom view of the integrated shipping label and packing list form of FIG. 3a according to at least one embodiment of the present disclosure.

FIG. 3b shows a second side 200 of a label sheet 10 according to at least one embodiment of the present disclosure. Only paper material ply 14 and liner ply 16 are visible in FIG. 3b. Adhesive layer 15 (not visible in FIG. 3b) is between paper material ply 14 and liner ply 16. As shown in FIG. 3b, label sheet 10 includes four edges comprising the boundary of label sheet 10, namely edge one S1, edge two S2, edge three S3, and edge four S4.

As shown in FIG. 3b, label sheet 10 comprises packing list label 18, packing list 108, shipping label 211, and lines of weakness 103, 104, 105, 106, 107, 201, and 206. Line of weakness 206 defines a boundary of shipping label 211. Line of weakness 201 is outside the perimeter defined by lines of weakness 103, 104, 105, 107, but inboard of the location of line of weakness 101 on first side 100 of label sheet 10 according to this embodiment of the present disclosure. Line of weakness 101 is not visible from second side 200 in this embodiment of the present disclosure, but is shown in phantom in FIG. 3b. Packing list 108 comprises second packing list surface 210.

According to the present disclosure, lines of weakness 101, 103, 104, 105, 106, 107, 201, and 206 may be continuous diecuts or perforations, and may be extended all or a portion of the way through label sheet 10. In the embodiment of label sheet 10 shown in shown in FIGS. 3a, 3b, line of weakness 101 is a continuous diecut the depth of which extends through paper material ply 14, but not through liner ply 16 (liner ply 16 is not visible in FIG. 3a). In the embodiment of label sheet 10 shown in shown in FIGS. 3a, 3b, line of weakness 201 is a continuous diecut the depth of which extends through liner ply 16 but not through paper material ply 14. In the embodiment of label sheet 10 shown in shown in FIGS. 3a, 3b, line of weakness 206 is a continuous diecut the depth of which extends through paper material ply 14, but not through liner ply 12 (liner ply 12 is not visible in FIG. 3b). In the embodiment of label sheet 10 shown in shown in FIGS. 3a, 3b, lines of weakness 103, 104, 105, 106, 107 are perforations that extend through both paper material ply 14 and liner ply 16.

Figure 7:
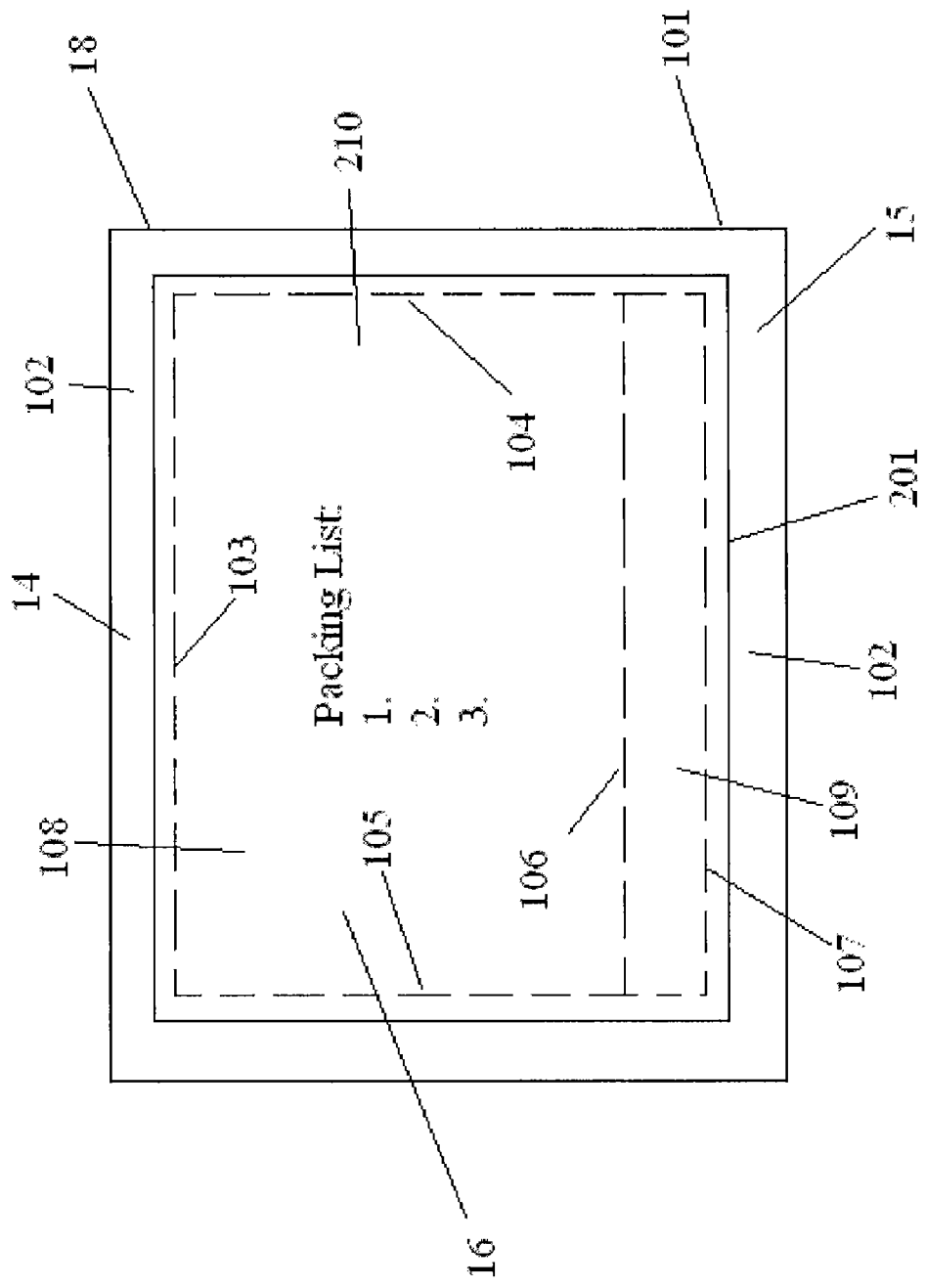
FIG. 7 shows an embodiment of a packing list label according to at least one embodiment of the present disclosure after removal an integrated shipping label and packing list form.

In the embodiment of label sheet 10 shown in FIGS. 3a, 3b, lines of weakness 101, 201 are designed to facilitate removal of packing list label 18 from label sheet 10. Packing list label 18 separates from label sheet 10 at lines of weakness 101, 201. FIG. 7 shows an embodiment of packing list label 18 according to the present disclosure after removal from label sheet 10. Shown in FIG. 7 is packing list label 18, which has been separated from label sheet 10 at lines of weakness 101, 201. As shown in FIG. 7, packing list label 18 comprises packing list 108. Packing list 108 comprises adhered-together portions of paper material ply 14 and liner ply 16.

Figure 8:
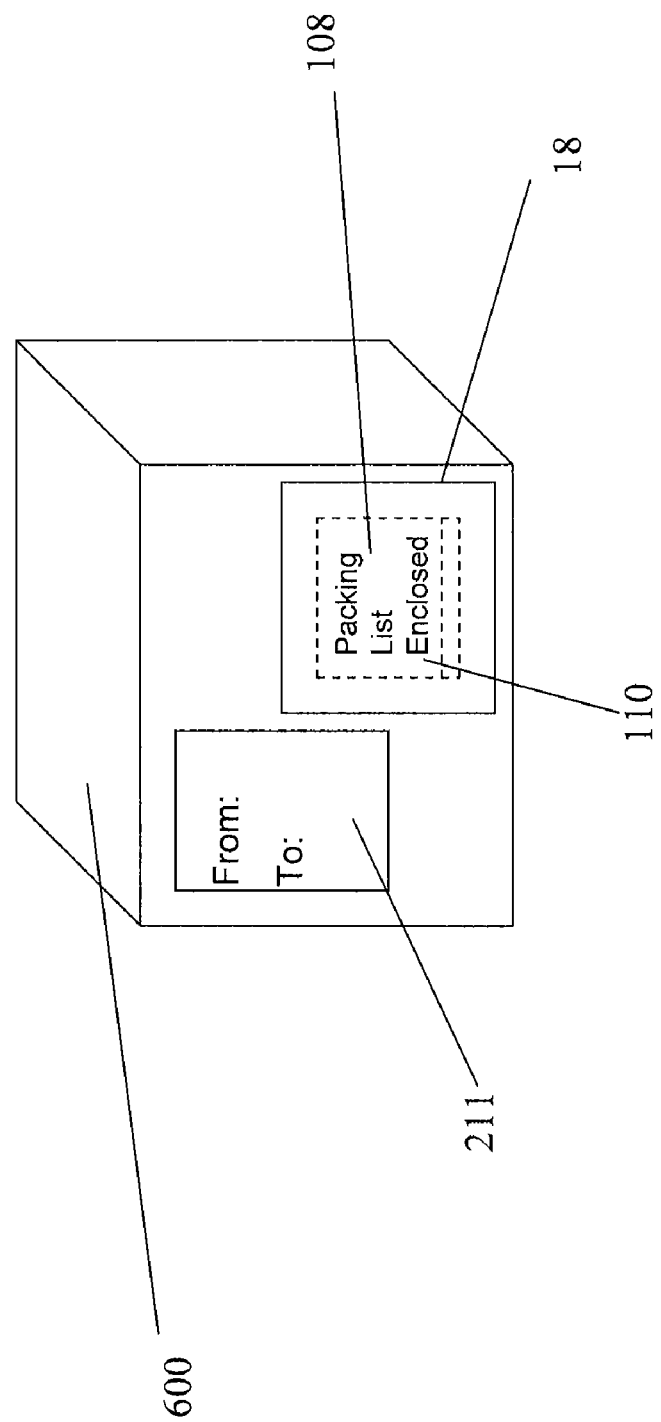
FIG. 8 shows an isometric view of a packing list and address label attached to a package according to at least one embodiment of the present disclosure.

Separating packing list label 18 from label sheet 10 exposes adhesive 15 in the area of frame 102, as shown in FIG. 7. Packing list label 18 then may be adhered to a package by adhering adhesive 15 to a surface of the package, thereby concealing the indicia printed on second packing list surface 210 of packing list 108. FIG. 8 shows a package 600 with packing list label 18 adhered thereto. As shown in FIG. 8, first packing list surface 110 is visible after packing list label 18 is adhered to package 600. Second packing list surface 210 is facing the surface of package 600 to which packing list label 18 is adhered.

In the embodiment of label sheet 10 shown in FIGS. 3a, 3b, lines of weakness 103, 104, 105, 106 are designed to facilitate removal of the packing list 108 from the packing list label 18, and lines of weakness 104, 105, 106, 107 are designed to facilitate the removal of a peel strip 109. Packing list 108 separates from packing list label 18 at lines of weakness 103, 104, 105, 106. Peel strip 109 separates from packing list label 18 at lines of weakness 104, 105, 106, 107.

In the embodiment of label sheet 10 shown in FIGS. 3a, 3b, line of weakness 206 is designed to facilitate removal of shipping label 211 from label sheet 10. Shipping label 211 separates from label sheet 10 at line of weakness 206, but adhesive 13 is retained on a surface of shipping label 211 after shipping label 211 is separated from label sheet 10. Shipping label 211 thereafter may be adhered to a package by adhering adhesive 13 to a surface of the package. FIG. 8 shows a package 600 with packing list label 18 and shipping label 211 adhered thereto.

In at least one embodiment of label sheet 10 according to FIGS. 3a, 3b, paper material ply 14 are liner ply 16 is permanently adhered together in the area bounded by line of weakness 201. In at least one such embodiment, liner ply 16 is void of release coating 16a in the area bounded by line of weakness 201, so that adhesive 15 permanently adheres together paper material ply 14 are liner ply 16 in the area bounded by line of weakness 201

Figure 4:
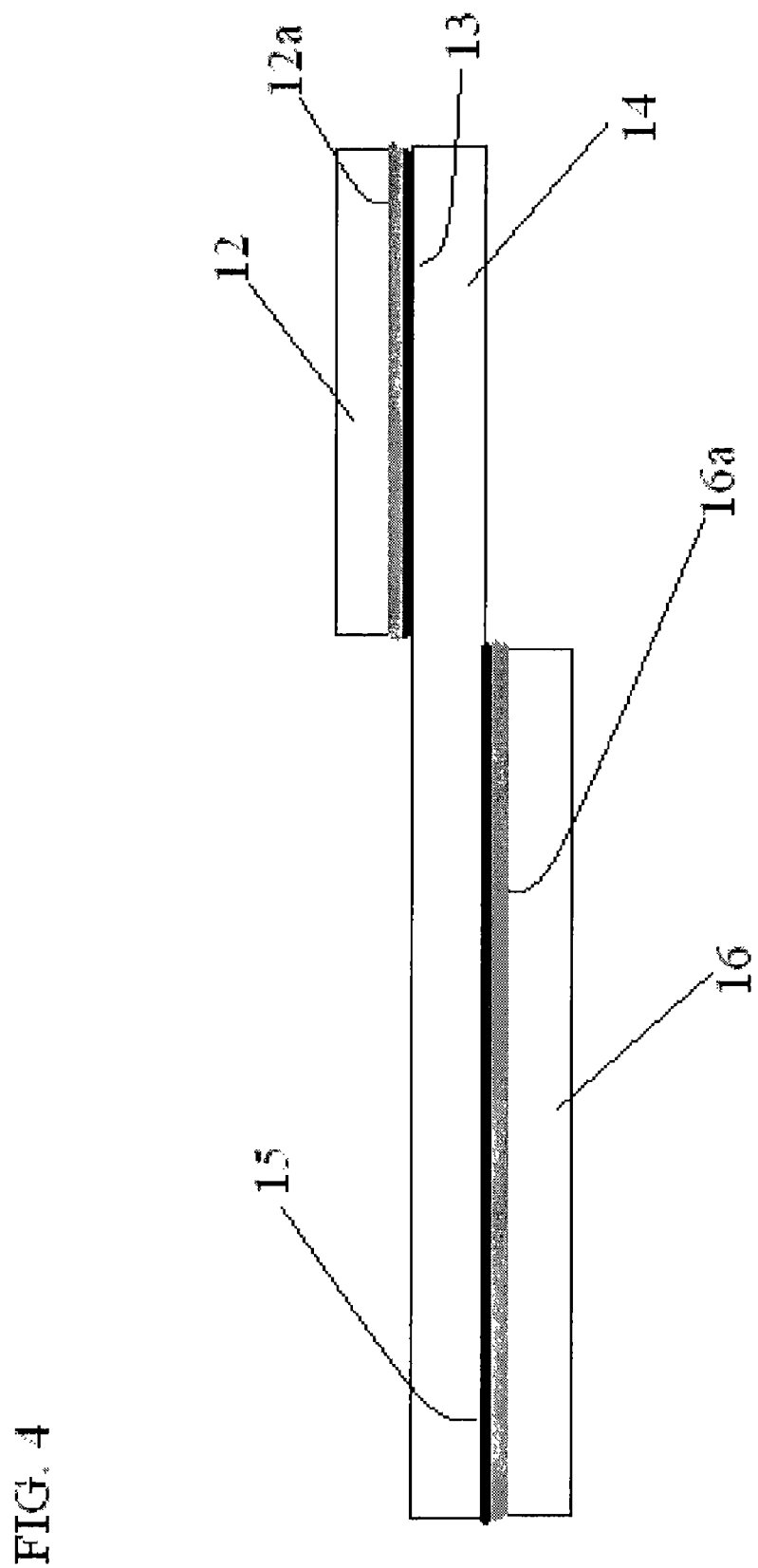
FIG. 4 shows a cross-sectional view taken along line II-II of the label sheet of FIG. 1.

FIG. 4 shows a cross-sectional view of label sheet 10, taken on line II-II of FIG. 1. Shown in FIG. 4 are liner ply 12 comprising release coating 12a, adhesive layer 13, paper material ply 14, adhesive layer 15, and liner ply 16 comprising release coating 16a. Liner ply 12 may be removably adhered to paper material ply 14 by adhesive layer 13. Liner ply 16 may be removably adhered to paper material ply 14 by adhesive layer 15.

In the embodiment shown in FIG. 4, liner ply 12 is coated with release coating 12a, and liner ply 16 is coated with release coating 16a. Release coating 12a faces adhesive layer 13, and mitigates the ability of adhesive layer 13 to adhere to liner ply 12. Release coating 16a faces adhesive layer 15, and mitigates the ability of adhesive layer 15 to adhere to liner ply 16.

As shown in FIG. 4, liner ply 12 and liner ply 16 may be removably adhered to paper material ply 14 in such a manner that liner plies 12, 16 do not overlap across paper material ply 14. The benefits of this configuration are discussed below.

Adhesive layer 13 is selected so as to securely adhere liner ply 12 to paper material ply 14 until it is desired to remove at least a portion of the paper material ply 14 from the liner ply 12. In at least one embodiment, adhesive layer 13 comprises a pressure sensitive adhesive, which may be, for example, a hot melt adhesive. In at least one embodiment, a liner ply 12 may coated with release coating 12a. Accordingly, in such an embodiment at least a portion of the paper material ply 14 may be removed from the liner ply 12 while retaining adhesive 13 on that portion of the paper material ply 14, and the portion of the paper material ply 14 thereafter may be re-adhered to one or more other surface(s).

The adhesive layer 15 is selected so as to securely adhere paper material ply 14 to liner ply 16 until it is desired to remove at least a portion of the paper material ply 14 from liner ply 16. In at least one embodiment, adhesive layer 15 comprises a pressure sensitive adhesive, which may, for example, be a hot melt adhesive. In at least one embodiment, a liner ply 16 may coated with release coating 16a. Accordingly, in such an embodiment at least a portion of the paper material ply 14 may be removed from the liner ply 16 while retaining adhesive 15 on that portion of the paper material ply 14, and the portion of the paper material ply 14 thereafter may be re-adhered to one or more other surface(s).

Figure 5A:
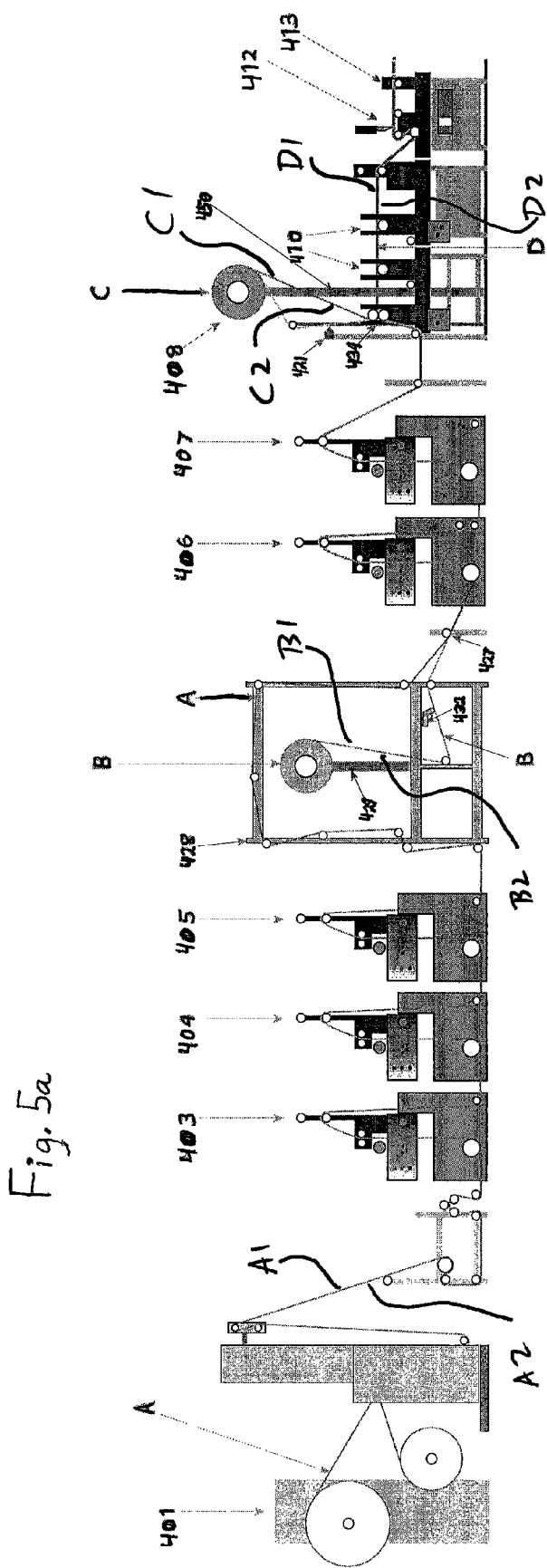
FIG. 5a shows a system according to at least one embodiment of the present disclosure for manufacturing an integrated shipping label and packing list form.

In at least one embodiment of the present disclosure, at least one discrete label sheet may be formed from a continuous roll or web of paper material and two continuous rolls or webs of liner. As shown in FIG. 5a, a label sheet may, for example, be manufactured in one pass on a 5-color rotary flexographic label press with hot melt adhesive coating stations 428, 408 and rotary die cutting capabilities 410, 413. The manufacturing process may include webs of material A, B, C, multiple flexo printheads 403, 404, 405, 406, 407, hot-melt adhesive coating heads 421, 432, and multiple lamination processes 427, 434. The sheets may be cut to a desired size at station 413.

In FIG. 5a, a roll of paper A is mounted on an unwind 401, such as, for example, a butt splicer. The roll of paper A includes opposing first and second sides A1, A2. The roll of paper A is unwound from the unwind 401 and webbed, or fed, through the system of FIG. 5a, including flexographic printheads 403, 404, 405, 406, 407 to print text, shapes, and the like, at a predetermined rate. Paper material A is routed along various guides and idlers. Guides may include rollers or the like.

At first hot-melt adhesive coating station 428, a roll of silicone coated liner B is mounted on an unwind device 429. The liner B may include opposing first and second sides B1, B2, where one of the sides may be coated with silicone, such as first side B1 in FIG. 5a. The liner B is webbed around idler rollers and then it is webbed across hot-melt adhesive slot die applicator 432. At applicator 432, adhesive is applied to the silicone coated side of the liner material B. After the adhesive is applied, the adhesive coated liner may be laminated to the second side A2 of the paper web A. This method of coating adhesive is called transfer coating. Once the adhesive coated liner is laminated to the paper, at least a portion of the adhesive will transfer from the silicone coated side of the liner to the paper, resulting in a pressure sensitive label with paper as the face material. The liner then serves as the carrier for the label. As described below, after laminating liner material B to paper material A, at least a portion of paper material A may later be removed completely from liner material B. In FIG. 5a, the paper web A travels above the unwind 429 and the hot melt adhesive applicator 432 to facilitate lamination to the second side of paper web A at lamination point 427.

At second hot-melt adhesive coating station 408, a roll of silicone coated liner C, where one side of the liner is coated with silicone, is mounted on an unwind device 450. The liner C may include opposing first and second sides C1, C2, where one of the sides may be coated with silicone, such as second side C2 in FIG. 5a. The liner C is webbed around idler rollers and then it is webbed across hot-melt adhesive slot die applicator 421. At applicator 421, adhesive is applied to the silicone coated side of the liner C. After the adhesive is applied, the adhesive coated liner is laminated to the first side of the paper web A at lamination station 434. Again, this method of coating adhesive is called transfer coating. Once the adhesive coated liner is laminated to the paper, at least a portion of the adhesive will transfer from the silicone coated side of the liner to the paper, resulting in a pressure sensitive label with paper as the face material. The liner then serves as the carrier for the label. As described below, after laminating liner material C to paper material A, at least a portion of paper material A may later be removed completely from liner material C. Of course, liner B and liner C may be laminated to paper web A in any order. For example, by reordering the machines in FIG. 5a, the lamination, application of adhesive, or the like may be performed in a different order.

The lamination of the liners B, C to the paper material A forms web D, which includes opposing first and second sides D1, D2. A typical arrangement of layers of web D from top to bottom includes a segment of silicone coated liner, approximately flush with one edge of the web; an adhesive, which is coated within the edges of the liner described above; paper material that extends the full width of the web; an adhesive, which is coated within the edges of the liner described below; and a segment of silicone coated liner, approximately flush with the edge of the web opposite the other silicone coated liner segment. By not overlapping liners B, C relative to the width of paper A, multiple label sheets may be stacked upon each other without causing high or low areas in the stack, the stack will be level. If liners overlap, there will be a bulge in the stack in the area where the overlap occurs. In other words, when sheets are stacked, they may be arranged such that liners of different sheets may at least partially fill the area of a sheet that is not covered by its own liners. In this way, the sheets may be complementary. This is particularly important for storing large quantities of label sheets, as well as other uses.

Next, the web D, which includes paper web A and liners B, C, can be die-cut in the rotary die stations 410. In one of the die stations 410, a first side D1 of the web D may be die cut to form lines of weakness such as, for example, lines of weakness 101, 103, 104, 105, 106, 107 shown in FIG. 3a.

At the printheads 403, 404, 405, indicia such as instructions for removing the packing list, logos, etc. may be printed on first side A1 and/or second side A2. At the printheads 406, 407, indicia such as instructions for removing the packing list, logos, etc. may be printed on side A1 and/or side B2. Both sides of the web may be printed by any printhead. It should be noted that one or both sides (or neither side) of the web may be printed during manufacturing of the label sheet. As such, a label sheet may be formed without printing or otherwise creating indicia on the label sheet. Furthermore, as described below, at least a portion of the sheet may be printed with indicia on a printer that is separate and distinct from the manufacturing process which physically formed the label sheet. For instance, a customer may receive the formed label sheets, for example, from a store or through the mail. The customer may then print indicia, such as unique customer data, on the label sheets using customer's own printer or some other printer. Of course, the manufacturing process may print indicia and then the customer's own printer may print further indicia.

Referring back to FIG. 5a, in the other die station 410, the second side D2 of web D is die cut to form one or more lines of weakness such as, for example, lines of weakness 201 and 206 shown in FIG. 3b. Such lines of weakness may define a printable shipping label, such as shipping label 211, which may be 4"×6" or other dimensions, on the paper section of the sheet. In defining such a printable shipping label, the rules of the die may cut through the paper but not through the silicone coated liner C. Based on the cut to form the shipping label, the shipping label may be peelable from the liner C. As an example, a shipping label such as shipping label 211 may be positioned 1.25" from the top and bottom edges of the second side 200 of label sheet 10, and ¼" from a side edge of the sheet 10. After printing indicia on such a printable shipping label, the shipping label may be removed from the label sheet and applied to a package. Configurations of the present disclosure may include one or more dies to meet the die cutting and punching needs of a particular label design.

At the printheads 403, 404, 405, 406, 407, indicia such as instructions for removing the packing list, logos, return addresses, etc. may be printed within the printable shipping label or printable packing list. The web D may be cut to various widths at the slitter station 412. The web may also be run through a rotary sheeter station 413, where the sheets may be cut to various lengths.

After trimming the web D to final sheet size, the product may be an 8.5"×11" label sheet with a 4.5" wide section of adhesive coated liner that is laminated flush or close to an edge of a first side of a label sheet (such as edge S3 of first side 100), and a 6.375" wide section of adhesive coated liner that is laminated flush or close to an edge of a second side of the label sheet is opposite the first edge (such as edge S4 of second side 200).

It should also be noted that the operations described above may be performed in any order, such as to satisfy specific requirements. As such, printing, adhesive coating, laminating, die cutting, and other operations may be performed in various configurations. As described above, the finished product may be specified as a sheet, but the product could also be furnished in fanfolded stacks or on rolls.

Referring now to FIG. 5b, according to one embodiment of the present disclosure the direction of travel DOS of a label sheet through a manufacturing system may be parallel with sides S3, S4 of the sheet. Of course, the label sheet may travel in other orientations through a manufacturing system.

Figure 6:
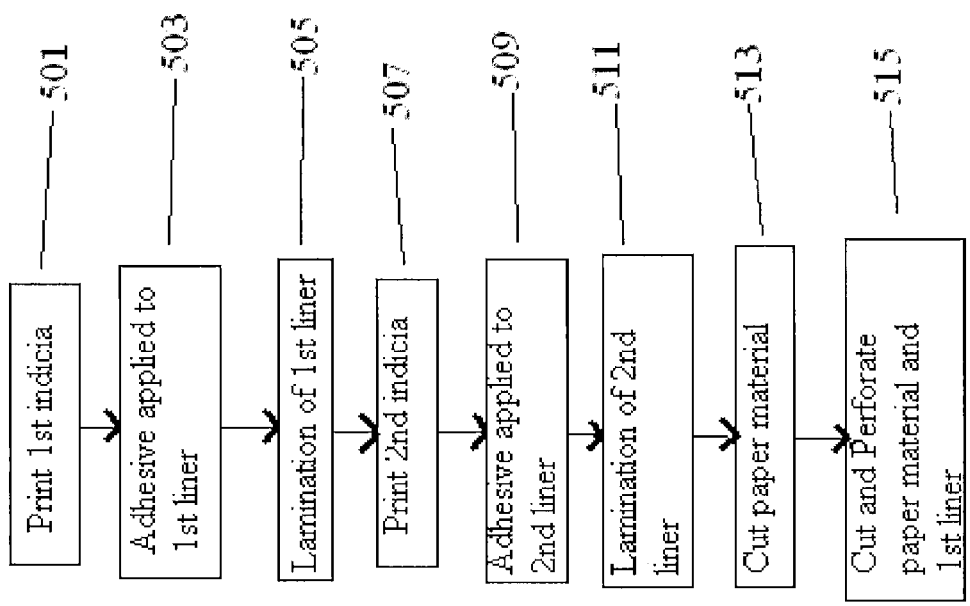
FIG. 6 shows a flowchart illustrating a method according to at least one embodiment of the present disclosure.

FIG. 6 shows a flowchart illustrating a method according to at least one embodiment of the present disclosure for manufacturing labels from a continuous roll or web of paper material and two continuous rolls or webs of liner (first and second liner material), wherein the paper material comprises opposing first and second sides, a width, and a length and wherein the liner materials each comprise a silicone coated side. In step 501 of FIG. 6, a first indicia is printed on the first side of the paper material in registration with the eventual location of a first removable packing list label. In step 503 of FIG. 6, adhesive is applied to the silicone coated side of the first liner material. In step 505 of FIG. 6, the silicone coated side of the first liner material is laminated to the second side of the paper material. In step 507 of FIG. 6, a second indicia is printed on the first side of the paper material and/or the non-silicone coated side of the first liner material. In step 509 of FIG. 6, adhesive is applied to the silicone coated side of the second liner material. In step 511 of FIG. 6, the silicone coated side of the second liner material is laminated to the first side of the paper material. In step 513 of FIG. 6, the paper material is cut to form a shipping label. In step 515 of FIG. 6, the paper material and first liner material are cut and perforated to form a packing list label.

According to at least one embodiment of the present disclosure, after the label sheet is formed, an end user may print additional indicia on such a label sheet using a conventional printer. The printer may, for example, print on the second side 200 of the sheet 10. Indicia such as packing list data may be printed on second packing list surface 210. Indicia such as shipping label data may be printed on shipping label 211.

A printer may generally be adapted to print indicia on paper material ply 14 and/or liners 12, 16. In at least one embodiment of the present disclosure, a printer may be an ink jet printer, a laser printer, a rotary letterpress printer, an offset printer, a digital printer, or the like. The inks, toners, or other printing materials used in a printer are selected to be compatible with paper material ply 14 and liners 12, 16. Such inks may include water-based flexographic inks, UV curable inks, or the like.

A label sheet according to the present disclosure may be used where it is desirable for the customer or end user to have the flexibility of printing his or her own indicia on the label sheet and to produce a packaging list that protects the confidentiality of information. Various industries, including businesses that regularly send goods to customers after selling those goods through their business websites, may find a label sheet according to the present disclosure useful in everyday business.

While this disclosure has been described as having a preferred design, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. An integrated shipping label and packing list form comprising:
    a first sheet material having opposing first and second sides and a first width;
    a second sheet material having opposing first and second sides and a second width, said second width being less than said first width, said first side of said second sheet material comprising a release coating on at least a portion thereof, wherein said first side of said second sheet material is adhered to said second side of said first sheet material;
    a third sheet material having opposing first and second sides and a third width, said third width being less than said first width, said first side of said third sheet material comprising a release coating on at least a portion thereof, wherein said first side of said third sheet material is adhered to said first side of said first sheet material;
    a first packing list label boundary defined in said first side of said first sheet material;
    a second packing list label boundary defined in said second side of said second sheet material, said second packing list label boundary being inboard of said first packing list label boundary; and
    a first shipping label boundary defined in said second side of said first sheet material.

2. The integrated shipping label and packing list form of claim 1, further comprising:
    a packing list label comprising adhered-together portions of said first sheet material and said second sheet material, said packing list label being separable from said first sheet material at said first packing list label boundary and from said second sheet material at said second packing list label boundary, wherein if said packing list label is separated at said first packing list label boundary and at said second packing list label boundary said packing list label comprises an anterior surface and a posterior surface, said anterior surface comprising a portion of said first sheet material within said first packing list label boundary, said posterior surface comprising a portion of said second sheet material inboard of said second packing list label boundary and a portion of said first sheet material outside of said second packing list label boundary and within said first packing list label boundary, wherein said segment of said posterior surface outside of said second packing list label boundary and within said first packing list label boundary is at least partially covered with an adhesive.

3. The integrated shipping label and packing list form of claim 2, wherein said packing list label further comprises:
   at least one line of weakness in said adhered-together portions of said first sheet material and said second sheet material and inboard of said second packing list label boundary, said at least one line of weakness defining a packing list sheet removeable from said packing list label at said at least one line of weakness.

4. The integrated shipping label and packing list form of claim 2, further comprising:
   a shipping label, said shipping label comprising a portion of said first sheet material within said first shipping label boundary, said shipping label being separable from said first sheet material at said first shipping label boundary and removable from said third sheet material, wherein if said shipping label is separated at said first shipping label boundary and removed from said third sheet material, said shipping label comprises a front surface and an opposing rear surface, said rear surface corresponding to said first side of said first sheet material, said rear surface being at least partially covered with an adhesive.

5. The integrated shipping label and packing list form of claim 1, wherein the sum of said second width and said third width is not greater than said first width.

6. The integrated shipping label and packing list form of claim 1, wherein said first sheet material comprises opposing first and second edges, and wherein said second sheet material is substantially flush with said first edge.

7. The integrated shipping label and packing list form of claim 6, wherein said third sheet material is substantially flush with said second edge.

* * * * *